(12) United States Patent
Devi et al.

(10) Patent No.: US 9,651,389 B2
(45) Date of Patent: May 16, 2017

(54) GENERATION OF LOCATION AREA BOUNDARIES

(71) Applicant: International Business Machines Corporation, Armonk, NY (US)

(72) Inventors: Umamaheswari C. Devi, Bangalore (IN); Ravindranath Kokku, Hyderabad (IN); Vinay Kumar Kolar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/885,791

(22) Filed: Oct. 16, 2015

(65) Prior Publication Data
US 2017/0108340 A1    Apr. 20, 2017

(51) Int. Cl.
*G01C 21/12* (2006.01)
*H04W 24/00* (2009.01)
(Continued)

(52) U.S. Cl.
CPC ............ *G01C 21/30* (2013.01); *G01C 21/34* (2013.01)

(58) Field of Classification Search
USPC ................ 701/422; 455/456.1; 705/14.36
See application file for complete search history.

(56) References Cited

U.S. PATENT DOCUMENTS 6,141,552 A * 10/2000 Sendonaris ........... H04W 16/18
                                                                   455/436
9,188,455 B2 * 11/2015 Tava .................. G01C 21/3484
(Continued)

FOREIGN PATENT DOCUMENTS

EP          2506233 B1      3/2012

OTHER PUBLICATIONS

Akyildiz, Ian F. et al., "Movement-Based Location Update and Selective Paging for PCS Networks", IEEE/ACM Transactions on Networking, Aug. 1996, vol. 4, No. 4, 10 pages, IEEE Digitial Library.

(Continued)

*Primary Examiner* — Tyler Paige
(74) *Attorney, Agent, or Firm* — Ference & Associates LLC

(57) ABSTRACT

One embodiment provides a method including: utilizing at least one processor to execute computer code that performs the steps of: receiving at least one location map comprising a plurality of possible routes; identifying at least one location area configuration, wherein the location area configuration identifies a location, relative to the at least one location map, of at least one location area boundary segment; computing a utility of the at least one location area configuration, wherein the utility comprises an identification of any usefulness of identifying a route comprising at least one identified sub-route and wherein the at least one sub-route is identified using the at least one location area boundary segment; identifying at least one prominent location area boundary segment, wherein a prominent location area boundary segment comprises a location area boundary segment having a computed utility exceeding a predetermined threshold; and generating a location area map comprising a plurality of identified prominent location area boundary segments, wherein the location area map defines boundaries of a location area. Other variants and embodiments are broadly contemplated herein.

20 Claims, 6 Drawing Sheets

(51) Int. Cl.
*G06Q 30/00* (2012.01)
*G01C 21/30* (2006.01)
*G01C 21/34* (2006.01)

(56) References Cited

U.S. PATENT DOCUMENTS

| | | | | |
|---|---|---|---|---|
| 2008/0178226 | A1* | 7/2008 | Lee | H04W 48/16 725/68 |
| 2011/0172905 | A1* | 7/2011 | Schroder | G01C 21/3415 701/533 |
| 2011/0219027 | A1* | 9/2011 | Uyama | G01C 21/32 707/769 |
| 2011/0224893 | A1* | 9/2011 | Scofield | G01C 21/3492 701/119 |
| 2011/0270517 | A1* | 11/2011 | Benedetti | G01C 21/20 701/533 |
| 2012/0130796 | A1* | 5/2012 | Busch | G06Q 30/02 705/14.36 |
| 2012/0290383 | A1* | 11/2012 | Busch | G06Q 30/02 705/14.36 |
| 2014/0019041 | A1* | 1/2014 | Kluge | G01C 21/3469 701/430 |
| 2014/0248910 | A1* | 9/2014 | Dave | H04W 4/021 455/456.3 |
| 2014/0278074 | A1* | 9/2014 | Annapureddy | G01C 21/3453 701/468 |
| 2014/0279012 | A1* | 9/2014 | Scofield | G06Q 30/0261 705/14.58 |

OTHER PUBLICATIONS

Bar-Noy, Amotz et al., "Mobile Users: To Update or not to Update?", INFOCOM '94, Networking for Global Communications, 13th Proceedings, Jun. 12-16, 1994, Toronto, Ontario, 7 pages, IEEE Digital Library.

Xie, Hai et al., "Dynamic Location Area Management and Performance Analysis", 43rd IEEE Vehicular Technology Conference, May 18-20, 1993, Secaucus, NJ, USA, 4 pages, IEEE Digital Library.

* cited by examiner

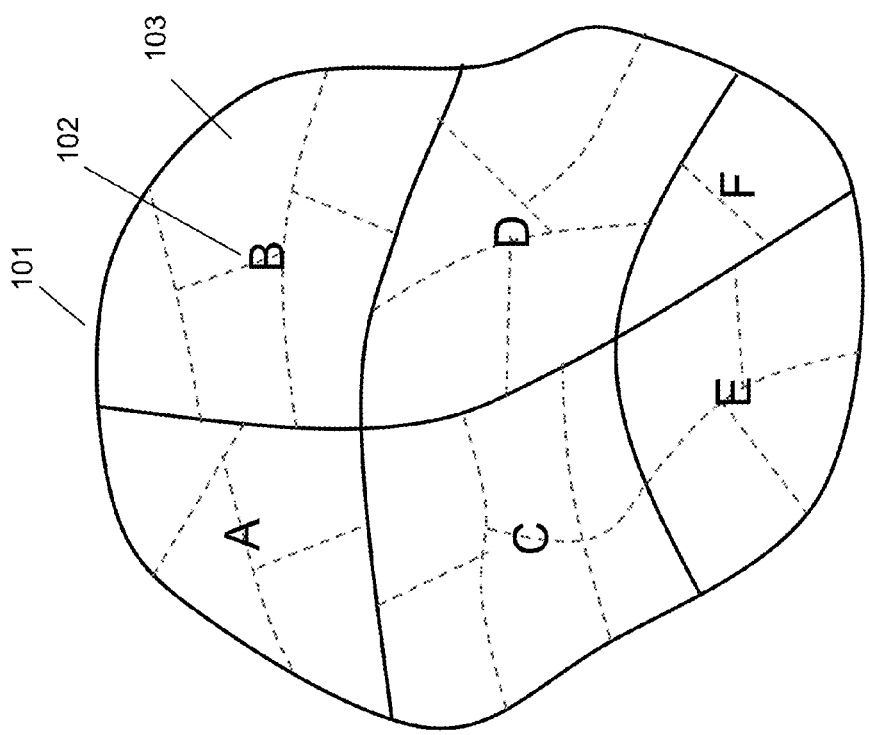

GENERATION OF LOCATION AREA BOUNDARIES

BACKGROUND

User location information is used by many different companies and business entities to enhance user experience. Therefore, many companies and entities have an interest in determining how users travel throughout a region (e.g., a town, country, geographical region, etc.). Gathering this information allows companies to identify user locations and possibly adjust business practices based on this information. For example, a phone company may want to identify user locations and the time associated with the location to adjust their networks to handle the cellular traffic better. Other companies may wish to use the information to learn habits of users in order to personalize information and assist in improving the user's experience. For example, a creator of a traffic application may want to know when a large number of users are on a particular roadway in order to reroute users around the traffic.

Companies have employed different strategies for gathering location information from users. For example, some companies may request permission from a user to access global positioning system (GPS) data and/or location data from the user's information handling device (e.g., smart phone, cellular phone, tablet, smart watch, GPS device, etc.). Another method that some companies employ is analyzing call detail records (CDRs) logged at cellular base stations, which may indicate the general location of the user at the time the cellular base station is accessed (e.g., the user is engaging in a communication, the user is downloading content, etc.).

BRIEF SUMMARY

In summary, one aspect of the invention provides a method of generating location area boundaries to optimize the identification of routes, the method comprising: utilizing at least one processor to execute computer code that performs the steps of: receiving at least one location map comprising a plurality of possible routes; identifying at least one location area configuration, wherein the location area configuration identifies a location, relative to the at least one location map, of at least one location area boundary segment; computing a utility of the at least one location area configuration, wherein the utility comprises an identification of any usefulness of identifying a route comprising at least one identified sub-route and wherein the at least one sub-route is identified using the at least one location area boundary segment; identifying at least one prominent location area boundary segment, wherein a prominent location area boundary segment comprises a location area boundary segment having a computed utility exceeding a predetermined threshold; and generating a location area map comprising a plurality of identified prominent location area boundary segments, wherein the location area map defines boundaries of a location area.

Another aspect of the invention provides an apparatus for generating location area boundaries to optimize the identification of routes, the apparatus comprising: at least one processor; and a computer readable storage medium having computer readable program code embodied therewith and executable by the at least one processor, the computer readable program code comprising: computer readable program code that receives at least one location map comprising a plurality of possible routes; computer readable program code that identifies at least one location area configuration, wherein the location area configuration identifies a location, relative to the at least one location map, of at least one location area boundary segment; computer readable program code that computes a utility of the at least one location area configuration, wherein the utility comprises an identification of any usefulness of identifying a route comprising at least one identified sub-route and wherein the at least one sub-route is identified using the at least one location area boundary segment; computer readable program code that identifies at least one prominent location area boundary segment, wherein a prominent location area boundary segment comprises a location area boundary segment having a computed utility exceeding a predetermined threshold; and computer readable program code that generates a location area map comprising a plurality of identified prominent location area boundary segments, wherein the location area map defines boundaries of a location area.

A further aspect of the invention provides a computer program product for generating location area boundaries to optimize the identification of routes, the computer program product comprising: a computer readable storage medium having computer readable program code embodied therewith, the computer readable program code comprising: computer readable program code that receives at least one location map comprising a plurality of possible routes; computer readable program code that identifies at least one location area configuration, wherein the location area configuration identifies a location, relative to the at least one location map, of at least one location area boundary segment; computer readable program code that computes a utility of the at least one location area configuration, wherein the utility comprises an identification of any usefulness of identifying a route comprising at least one identified sub-route and wherein the at least one sub-route is identified using the at least one location area boundary segment; computer readable program code that identifies at least one prominent location area boundary segment, wherein a prominent location area boundary segment comprises a location area boundary segment having a computed utility exceeding a predetermined threshold; and computer readable program code that generates a location area map comprising a plurality of identified prominent location area boundary segments, wherein the location area map defines boundaries of a location area.

An additional aspect of the invention provides a method of generating location area boundaries to optimize the identification of routes, the method comprising: utilizing at least one processor to execute computer code that performs the steps of: receiving at least one location map comprising a plurality of possible routes; receiving at least one cellular base station having an identified coverage area associated with the at least one location map; receiving at least one mobility record, wherein the at least one mobility record defines at least one common route through the at least one location map, wherein the at least one common route comprises more than one possible sub-route; identifying at least one location area configuration, wherein the location area configuration identifies a location, relative to the at least one location map, of at least one location area boundary segment; computing a utility of the at least one location area configuration, wherein the utility comprises an identification of any usefulness of identifying a route comprising at least one identified sub-route and wherein the at least one sub-route is identified using the at least one location area boundary segment and the at least one cellular base station; the computing a utility comprising identifying a number of sub-routes of the common route that can be identified using the at least one location area boundary segment; identifying at least one prominent location area boundary segment, wherein a prominent location area boundary segment comprises a location area boundary segment in which the number of sub-routes of the at least one common route that can be identified exceeds a predetermined threshold; and generating a location area map comprising a plurality of identified prominent location area boundary segments, wherein the generating comprises connecting the identified prominent location area boundary segments to define the boundaries of a location area.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 1 illustrates a visual representation of location area.

DETAILED DESCRIPTION

Figures 2A, 2B:
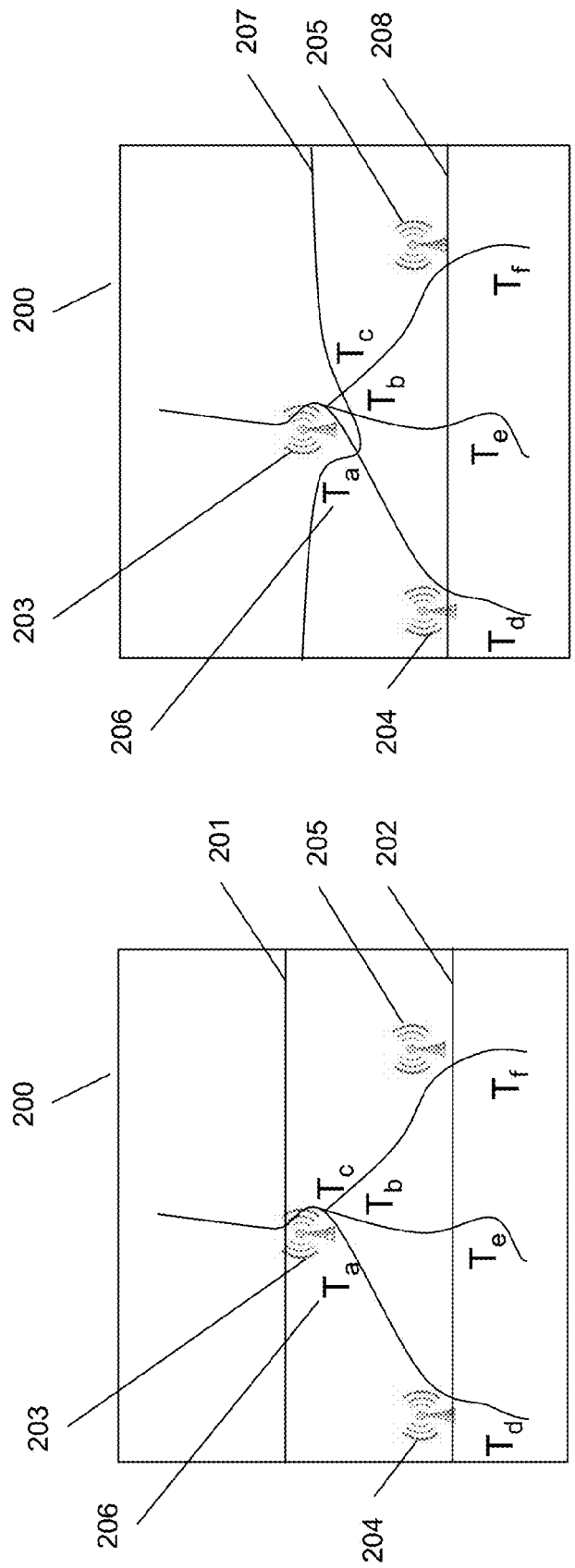
FIG. 2A and FIG. 2B illustrate the effect of optimizing a location area boundary.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

To determine how users travel throughout a region companies must have some method of locating the user within the region. In some cases an indication that a user is within a particular region is sufficient. However, for location information to be useful for other companies or entities the location information needs to have a finer granularity. In other words, rather than providing information regarding whether a user is in a region, the information needs to provide the company with more distinct location information, for example, the specific route that a user is traveling. One issue with gathering the location information at a finer granularity is that, generally, more data has to be provided and processed. This increase in data also increases storage requirements data processing capabilities, and cost for the entity requesting the information.

One way of getting a finer granularity with regard to user locations is to utilize GPS-enabled devices that users may carry. The problem with this approach is that the company cannot access the device to request the GPS location information without permission from the user. Additionally, some companies may not have the ability to access the device at all and may need users to upload the GPS location information. One problem with this method is that not all users carry GPS-enabled devices with them. Also, not all users who do have GPS-enabled devices will allow permission for a company to access the information, will be willing to expend the device's battery for uploading, or will remember to upload the GPS location information. These problems make this type of solution difficult to implement on a large scale. In a best case scenario, the company may be able to extrapolate location information gathered to match the amount of users actually active. However, such an extrapolation is not as accurate as may be desired.

Another solution to obtain a finer granularity is to analyze the call detail records (CDRs) logged at a cellular base station. One problem with this approach is that call detail records are generally only updated if a user is actively accessing a base station (e.g., making a telephone call, downloading content, etc.). Therefore, if a user is moving through a region but not accessing a base station, no CDRs will exist for the user. Another problem is that the CDRs contain details for all times that a user actively accesses a base station, even if the user is not moving through a region, making the CDRs very large. Processing all this data is very time-consuming and may not provide location information that the entity finds useful.

Accordingly, an embodiment provides a method of generating location area boundaries of cellular networks that allow optimization of identification of routes that users may traverse. Location areas are used for location management in 2G and 3G cellular networks. For example, using location areas an embodiment can identify the location of a mobile station (e.g., cellular phone, tablet, smart phone, etc.) that is not in active use. In this method, the service area of a cellular network is partitioned into location areas, with each location area consisting of a set of contiguous cells. Each location area is assigned a distinct location area code (LAC). Each base station broadcasts the LAC of the location area it belongs to.

A location area boundary is considered crossed when a user or a mobile station gets associated with a base station in a location area different than the location area of the base station that the mobile station was last associated with. When a user crosses a location area boundary or has been inactive for an extended period of time, the user's mobile station updates its current location to the cellular network by sending a location area update (LAU) request. In response, a home location register (HLR), which may be part of a cellular network infrastructure, logs a location area update (LAU) record, along with identification information of the base station from which the LAU was issued. In other words, when the user is mobile and crosses a defined boundary, a log will be made which may help to identify the base station that the user is associated with during the time of the update, thereby allowing an entity to track the movement of users throughout a region. The location area boundaries do not necessarily provide the exact route that a user is traveling, rather they act as virtual boundary lines. Therefore, the location area boundaries need to be located at locations which allow the entities to determine with a reasonable certainty the likely path that has been traversed by a user. The number of allowable location area boundaries within a particular region may be finite. Therefore, an embodiment provides a method for identifying prominent location area boundary segments.

A set of segments on a map through which one or more location areas pass through is referred to as a location area configuration. The prominent location area boundary segments may be identified by computing a utility of a location area configuration or location area boundary segment. The utility may comprise an identification of how useful it is to identify a particular route. In one embodiment, the usefulness is based upon whether the route is a commonly traveled route. Additionally, the usefulness may be based upon how many possible sub-routes are contained within a particular route and how many sub-routes can be identified in creating a location area boundary segment at the identified location. In identifying possible sub-routes and routes, an embodiment may use coverage areas (e.g., base station coverage areas, coverage areas from a single point, etc.) in conjunction with the location area boundary segments. After identifying a plurality of prominent location area boundary segments, an embodiment may connect the segments to generate a location area map.

The location area map provides an entity with a method of activating location area boundaries which would be most useful in tracking users throughout the region. This also provides the company a way of tracking the users without requiring user interaction, for example, the user uploading location information. Additionally, because the location area update (LAU) record is only updated when a user crosses a location area boundary, the dataset that needs processing is much smaller than some traditional methods. While an example of defining location areas within a cellular network will be used throughout this disclosure, the embodiments as described herein can be utilized in other applications and systems, for example, defining regions on a large scale farm to optimize the productivity of a worker.

FIG. 1 illustrates a visual representation of a location area in relation to a cellular network. Cellular network area 101 is partitioned into multiple location areas 102, separated by solid boundary lines. Each location area 102 is separated into cells 103, designated by dashed lines. The cells 103 may delineate the coverage area of a cellular base station. A single location area 102 may have multiple base stations within each location area 102; however, a single base station will belong to only a single location area 102.

The allowable number of location areas within a region is finite. Therefore, the location of the location area boundaries is critical to allow the identification of the most possible routes. For example, FIG. 2A and FIG. 2B show two example location area boundary configurations. FIG. 2A shows the location area boundaries 201 and 202 being located as straight lines across a region map 200. In this map, all three cells covered by the three base stations 203, 204, and 205 are within the location area at the center. Using the locations of base stations 203, 204, and 205 and the location area boundaries 201 and 202, an entity can identify some of the paths that a user may traverse. For example, an entity can detect when a user travels route (206) $T_d$ (due to the crossing of location area boundary 202 and subsequent connection to base station 204), $T_e$ (due to the crossing of location area boundary 202 and connection to base station 203), and $T_f$ (due to the crossing of location area boundary 202 and subsequent connection to base station 205).

If location area boundary 201 is curved slightly as shown in FIG. 2B at 207 such that base station 203 is now in the north-most location area, the entity can detect additional paths that a user may traverse. For example, an entity can detect the original three paths ($T_d$, $T_e$, and $T_f$) and additionally detect when a user travels route $T_a$ (due to the connection to base station 204 following the crossing of location area boundary 207), $T_b$ (due to no connection to any base station following the crossing of location area boundary 207), and $T_c$ (due to the connection to base station 205 following the crossing of location area boundary 207). Therefore, as illustrated by the simplified example of FIG. 2A and FIG. 2B, the slight modification of location area boundary 201 to location area boundary 207 allows an entity to detect twice as many routes that a user may traverse.

Figure 3:
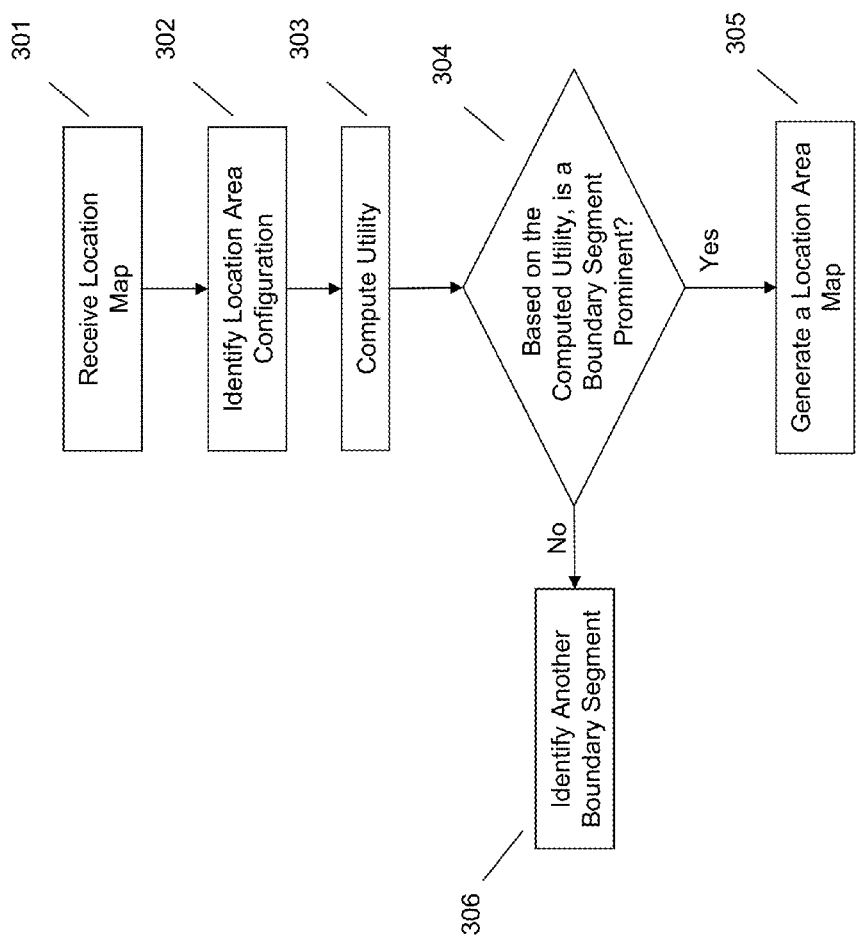
FIG. 3 illustrates an examplary method of generation of location area boundaries.

Referring to FIG. 3, at 301, an embodiment may receive at least one location map comprising a plurality of possible routes. For example, an embodiment may receive a region map showing different roads and paths within the region. As another example, an embodiment may receive a plantation map showing different possible routes that a worker may take to perform particular tasks. An embodiment may also receive additional inputs, for example, base station locations, coverage areas for the base station, mobility records for users, and the like.

Mobility records may identify common routes or trajectories taken by users. More specifically, the mobility records may identify where the user was located at particular times. Using the mobility records and location map, preprocessing can be performed consisting of trajectory snapping (e.g., snapping trajectories to paths on a road network on a map), route identification, and other processing to identify the most likely trajectory or route that a user traversed. For example, based upon the identified location of the user, preprocessing can identify the road or path that the user was near and make a best estimate of the route or trajectory taken. A route may be defined as an ordered sequence of (latitude, longitude) tuples denoting the path traveled along. A trajectory may be defined as an ordered sequence of (latitude, longitude, time) triples in increasing time order and denotes an instance of a route traveled at the specified times. The route or trajectory may include sub-routes or sub-trajectories which are contiguous parts of a route or trajectory, respectively.

At 302, an embodiment may identify at least one location area configuration. A location area configuration may identify the location of a location area boundary segment relative to the location map and possible routes within the location map. The location area boundary segment in a location area configuration may be placed manually or automatically by an embodiment. In one embodiment, a location area configuration may be initialized to an empty set after preprocessing. For example, an embodiment may identify a set of location area boundary segments that are candidates for inclusion in the final location area configuration. An embodiment may then overlay these boundary segments on a location map. For example, all the edges of square tiles of a rectangular grid could be one set of candidate location area boundary segments.

Figure 4:
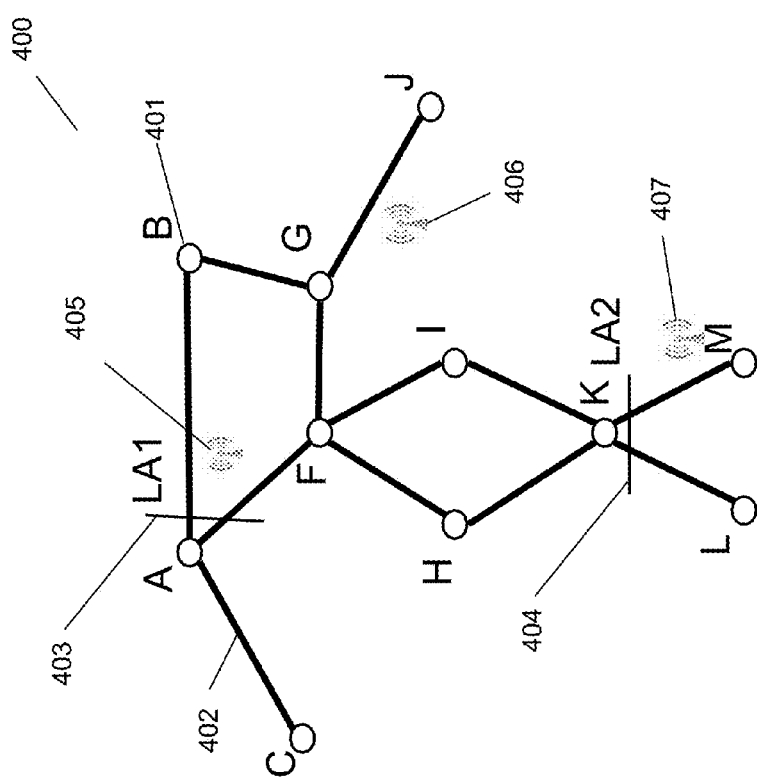
FIG. 4 illustrates an example location area configuration.

FIG. 4 illustrates an example location area configuration 400. The nodes 401 are represented by circles and letters. In practice, these nodes may represent popular locations that users visit, different cities within a region, road intersections, or other locations useful to an entity. The lines 402 connecting the nodes 401 may represent paths or roads that users may traverse to move from one node 401 to another node 401. The location area boundary segments 403 and 404 represent possible locations of locations area boundary segments. Using these boundary segments 403 and 404 and the location of base stations 405, 406, and 407, an embodiment may compute the utility of the at least one location area configuration 400 at 303 and use the method for selecting prominent location area boundary segments as described in more detail below.

The utility of a location area configuration is a rough indicator of the number of traveled routes that could be correctly identified or the extent to which the ambiguity in route identification is lowered. The extent to which a route is correctly identified or ambiguity in its identification is lowered, may be at least partially based on how many sub-routes can be identified using the location area boundary segment. For example, referring back to FIG. 4, if location area boundary segment 403 is in place, whenever a user traverses AB or AF, a location area update (LAU) record will be logged at the home location register for base station 405. Therefore, it can be concluded that the user traversed one of these sub-routes. Thus, the ambiguity in the path traveled by the user is lowered, which is used in computing the boundary segment's utility. The utility as computed at 303 may be computed for an entire location area configuration or may instead be computed for a single location area boundary segment within the location area configuration.

In one embodiment, computing the utility for a location area configuration may include identifying the unique routes and sub-routes that can be identified using the location area boundary or determining the extent to which identifying routes and sub-routes is lowered. In identifying the unique routes and sub-routes, the system may not name the routes (e.g., A to B) but may instead just count the number of unique routes and sub-routes that can be identified (e.g., there will be two unique sub-routes identified using this boundary). Additionally, in computing the utility for a location area configuration, the system may use any additional inputs that were received. For example, if base stations and coverage areas were provided more routes and sub-routes may be able to be identified due to the unique base station that the user may access. For example, referring to FIG. 4, ignoring the location area boundary segments (403 and 404), it can be identified when a user travels from node 401 K to node 401 M due to the coverage area of base station 407. As another example, if mobility records were received, and it is known that one route is more commonly traveled than another route, then identification of the sub-routes within the more commonly traveled route may have more utility than identification of sub-routes within the less commonly traveled route.

One method for computing the utility of a location area configuration includes listing all possible routes as a set (e.g., $\tau$), and all sub-routes as a set (e.g., $\sigma$), and defining two functions. The first function may be $f_\sigma$: $\tau \rightarrow \sigma$, (e.g., $f_\sigma$ (T$\epsilon\tau$)$\subseteq \sigma$), which maps a route T to a list of all the disjointed sub-routes in a. The second function may be $f_\sigma$: $\sigma \rightarrow \tau$(e.g., $f_\tau$(S$\epsilon\sigma$)$\subseteq \tau$), which maps a sub-route S to all routes in $\tau$ that the sub-route is a part of. For each route make a list of disjointed sub-routes.

As a simplified example, referring to FIG. 4, the set of sub-routes that are enabled, that is, can be identified, due to location area boundary segment 403 and base station 405 is: $\sigma_1$={AB, AF}. In other words, because location area boundary is at segment 403, an entity can distinguish when a user travels from node 401 A whether they travel to either node 401 B or node 401 F, due to a location area update (LAU) message logged at the home location register (HLR) for base station 405 in either case. The sub-route that is enabled due to location area boundary segment 404 and base station 407 is: $\sigma_2$={KM}. In other words, when a user travels from node 401 K, an entity can identify the user traveled to node 401 M because of the location area configuration (LAC) message that is logged when the user crossed location boundary segment 404 and connected to base station 407. The possible routes, if only a LAU log is made due to crossing location area boundary segment 403, can be represented as: $\tau_1$: {ABGJ, ABGF, AFIKL, AFHKL}. The possible routes if a user crosses both location boundary segments 403 and 404, thereby making LAU logs for both the base stations 405 and 407, can be represented as: $\tau_2$: {AFHKM, AFIKM}. The possible routes if only location area boundary segment 404 is crossed and a LAU log is made for base station 407, can be represented as: $\tau_3$: {HKM, IKM}. All remaining routes are represented if logs are not logged for either location area boundary segment 403 or 404.

As a working example, with respect to a location area configuration under consideration, let $\sigma_i \epsilon \sigma$, i=1, . . . , B, denote the set of sub-routes, one of which is traversed, when a LAU record is logged for base station i. For a given location area configuration, base station locations and their coverage areas are used for constructing these per-base station sub-route sets (e.g., $\sigma_1, \sigma_B$) as follows. The method works by considering each location area crossing or location area boundary segment in a location are configuration in order. For example, let location area (LA) crossing i run in a north-to-south manner. For LA crossing i, consider base stations on either side of the crossing (e.g., east and west of the crossing), within whose coverage area LA crossing i lies. For each base station b that is on one side of the crossing, for example, the east side of the crossing, find the linear boundary to the west of b, that is half-way to its cell edge. Add to $\sigma_b$ all sub-routes that cross the western boundary mentioned above in a west-to-east manner that are also not covered by any base station to the east of b. The same method is used for the other side of the crossing, for example, to west side of the crossing. For a location area (LA) crossing that runs east-to-west, a similar method is applied by considering base stations to the north and south of the crossing.

After constructing the per-base station sub-route sets (e.g., $\sigma_1, \ldots, \sigma_B$), construct $N \geq 1$ route sets (e.g., $\tau_1, \ldots, \tau_N$). Each route set denotes one possible set of routes that a user could have taken and is given by the set of base stations at which LAU records are logged in a trip. One method of constructing the above route sets is as follows: Let $\beta_1 \ldots \beta_N \subseteq \{1, \ldots, N\}$ denote subsets of base stations, with the following interpretation. If a LAU record is obtained at each base station of $\beta_i$ and no other base station, then one of the routes in $\tau_i$ is taken. Thus, there is a 1:1 mapping from $\beta_i \rightarrow \tau_i$. To construct $\tau_i$, we first initialize n=0. For each base station i, let $\tau_{curr}$ be the set of possible routes that could have been taken if a sample is obtained at base station i. $\tau_{curr}$ represents the set of all routes that pass through the sub-routes in $\sigma_i$. Then, for each $\tau_j$ in the route sets $\tau_1, \ldots, \tau_N$ do:

If $\tau_j \cap \tau_{curr} \neq \phi$ then: partition route set $\tau_j$ into two sets based on whether a location area log was obtained at $\beta_i$. For example:

$\tau_j = \tau_j \backslash (\tau_j \cap \tau_{curr})$; n=n+1; $\tau_n = \tau_j \cap \tau_{curr}$; $\beta_n = \beta_i \cup \{i\}$;
$\tau_{curr} = \tau_{curr} \backslash \tau_n$.

If $\tau_{curr} \neq \phi$ then: $\tau_{curr}$ denotes the routes possible if a LAU record is obtained only at only base station i. These routes should be in a set. Update as following:
n=n+1; $\tau_n = \tau_{curr}$; $\beta_i = \{i\}$. As an optimization step, split as appropriate all those route sets that contain routes that are in reverse directions to one other. For example, if $\tau_j = \{ABCD, CBA\}$, then split $\tau_j$ into subsets $\{ABCD\}$ and $\{CBA\}$.

The utility of the configuration can then be computed due to each $\tau_j$. First, determine the sub-routes (e.g., $\sigma'$) that are common to all the routes in $\tau_j$. Let $f(\tau')$=fraction of all trips through the routes in $\tau'$. Let x=utility per unit length per trip correctly identified and let y=penalty per unit length per trip wrongly assigned. Let $U_i$=x*length of $\sigma'$*fraction of trips through routes in $\tau_i$. Let $\tau'$=dominant trajectory of $\tau_1$ and let r-len=length of $\tau'$–length of $\sigma'$. The utility computation can then be expressed as: $U_i = U_i + x \cdot r\text{-len} \cdot f(\tau_i) - y \cdot \Sigma_{\tau \in \tau_j \backslash \tau} (\text{len}(\tau) - \text{len}(\tau_{curr}))$.

Another method of computing utility is using entropy. Entropy is associated with the uncertainty with which trajectories or routes can be assigned. For example, a scenario in which each of two routes is taken with equal probability has higher uncertainty and, therefore, higher entropy, than a scenario in which one route is more probable than the other. In other words, lower entropy indicates that the uncertainty associated with a route or sub-route assignment is very low. Having mobility records or location area logs (e.g., the logs associated with when people have crossed enabled location area boundaries), can allow an entity to identify how useful the particular location area boundary segment was (e.g., what the utility of the location area boundary segment is).

Entropy can be calculated using trajectories identified. To determine the entropy, the trajectories can be partitioned into subsets based on the location area update record logs when location area boundaries are enabled. Entropy would then be computed for each subset and scaled based on the probability of a particular route in the subset being taken. Such a computation would identify how useful having a particular location area boundary segment enabled was. An example computation of entropy includes constructing the sub-route sets (e.g., $\sigma_1, \ldots, \sigma_B$) and the route sets (e.g., $\tau_1, \ldots, \tau_N$) as described above. Then determine the fractions (e.g., $f_1, \ldots f_n$) of all input trips through the route sets (e.g., $\tau_1, \ldots, \tau_N$), respectively. Determine the entropies (e.g., $E_1, \ldots, E_n$) of the route sets (e.g., $\tau_1, \ldots, \tau_N$), respectively. The entropy E of a given location area configuration can then be represented as $\Sigma_{i=1}^n E_i \cdot f_i$.

After computing the utility of a particular location area configuration or boundary segment at 303, an embodiment may identify whether at least one of the boundary segments within the location area configuration is prominent at 304. A prominent location area boundary segment may be a boundary segment having a computed utility exceeding a predetermined threshold. For example, the predetermined threshold may be a comparison of the utility of the chosen boundary segment to the utility of other boundary segments which were not chosen. In other words, the threshold may be that the utility of the chosen boundary segment exceeds the utility of unused boundary segments. This predetermined threshold may be preprogrammed or may change for every location area. A prominent boundary segment may be considered to include a boundary segment which allows the identification of a specific number of sub-routes. For example, in order to be considered prominent the number of sub-routes identified may need to meet or exceed a particular number or threshold.

In determining a prominent boundary segment, the algorithm for computing the utility of a LA configuration as described above may be used to identify the prominent boundary segments. The algorithm may also be used to choose the LA boundary segments to add to the LA configuration that is iteratively constructed. In the iterative LA construction, an empty LA configuration is first used. During each iteration, each candidate location area boundary segment that was not previously identified for inclusion in the final LA configuration is included in the LA configuration under construction one at a time and the utility of each resulting LA configuration is computed. The location area boundary segment included in the configuration with the highest utility is permanently included in the LA configuration under construction. The remaining segments compete for inclusion again in the next iteration.

If mobility records have been received, a boundary segment having a high utility may include a boundary segment which allows identification of the most sub-routes in a commonly traveled route. For example, an entity may wish to know exactly which sub-route users are using when traversing a common route, but may care less about which sub-route users use when traversing a less common route. Alternatively, the prominent boundary segments may be identified by using prominent sub-routes. For example, with a commonly traveled route, commonly traveled sub-routes may be identified. The sub-routes may be weighted based upon which ones are traveled more frequently. Boundary segments which allow for identification of sub-routes having a greater weight may result in the boundary segment being identified as prominent, and therefore be included in the final LA configuration.

If the boundary segment is not prominent, an embodiment may identify another boundary segment and determine if it is prominent at 306. If, however, a boundary segment is identified as prominent at 304, the segment may be included in the final location area configuration as discussed above. Once a sufficient number of location area boundary segments have been added to the final LA configuration, an embodiment may generate a location area map at 305. The location area map may define the boundaries of a location area and may comprise a plurality of prominent location area boundary segments.

Figure 5:
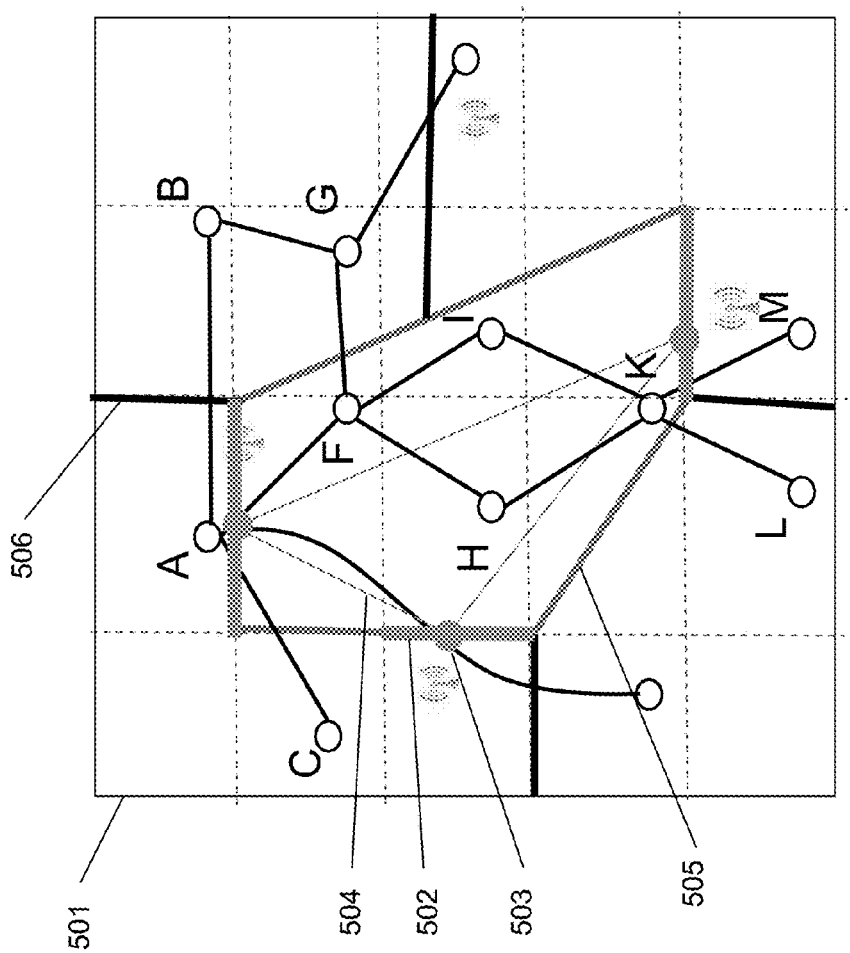
FIG. 5 illustrates an example location area map.

To generate the location area map, an embodiment may connect, or stitch, all the prominent location area boundary segments together to define the boundaries of the location area. FIG. 5 shows a simplified example location area map 501 for a small area. In one method, which may be used to generate the location area map, a rectangular grid with square tiles may be overlaid on the road network or location map. The prominent boundary segments 502 that were identified at step 304 are selected to match a tile edge. These boundary segments 502 are then reduced to a single point 503. Any points that are within a specified distance of a boundary are excluded. The specified distance may be different for each configuration and may be dependent on the size of the region. The points 503 are then connected in a convex hull 504. This shape is then modified to retain the tile edges 505, which may result in a hull (e.g., a location area (LA) hull) that is no longer convex.

If the number of points within the constructed LA hull is small, these points may be connected by using lines that partition the hull into roughly equal regions. For any points outside of the hull, these points may be connected by drawing a line from the edge of the hull to the region boundary. If there are no points outside the hull, then lines 506 may connect the hull to the region boundary partitioning the remaining area into roughly equal sized regions. On the other hand, if the number of points within the LA hull is large, then the steps above may be applied recursively to construct a second (inner) LA hull within the outer hull. The area between the outer and inner hulls may be partitioned using the points in between the two hulls, if any. The points within the inner hull may then be used to either partition the area or recursively apply the hull construction procedure. All base station within a given location area can then be assigned a unique location area code.

Another method for generating a location area map may be through the formulation of a coloring problem. To accomplish this, the location map may be overlaid with a grid having square tiles. The prominent boundary segments may be identified within the grid at the correct locations, using the procedure described above. The objective is to assign the same color (index) to the neighboring tiles of the grid as much as possible, except if the tiles are separated by a prominent boundary segment line. In this case, the tiles will be of different colors. An example of formulating such a coloring problem is as follows. Let the tiles of the grid be numbered consecutively, e.g., 1, 2, 3, etc. Let $x_i \geq 0$ represent the "color of tile i". Let $N(i)=\{$All tiles that are neighbors of i$\}$. Let C be the conflicting set which is the set of all pairs of tiles that are adjacent to each other but separated by a prominent boundary segment. A tuple (i,j) is added to the conflict set C if two tiles i and j have a boundary segment between them. Let $y_i$ be an indicator variable that is set to 1 if tile i has a color that is different from that of at least one of its neighbors. The optimization problem is to minimize the number of distinct location areas, which can be accomplished, for example, by the following:

$$\text{Min} \sum_i y_i \text{ such that: } x_i \neq x_j, \forall (i, j) \in C;$$

$$y_i = 0 \text{ if } \forall j = N(i), x_i = x_j,$$

$$\text{otherwise } y_i = 1.$$

solution to the above problem may be used to construct a location area map by combining each set of consecutive tiles that is assigned the same color into a location area.

Figure 6:
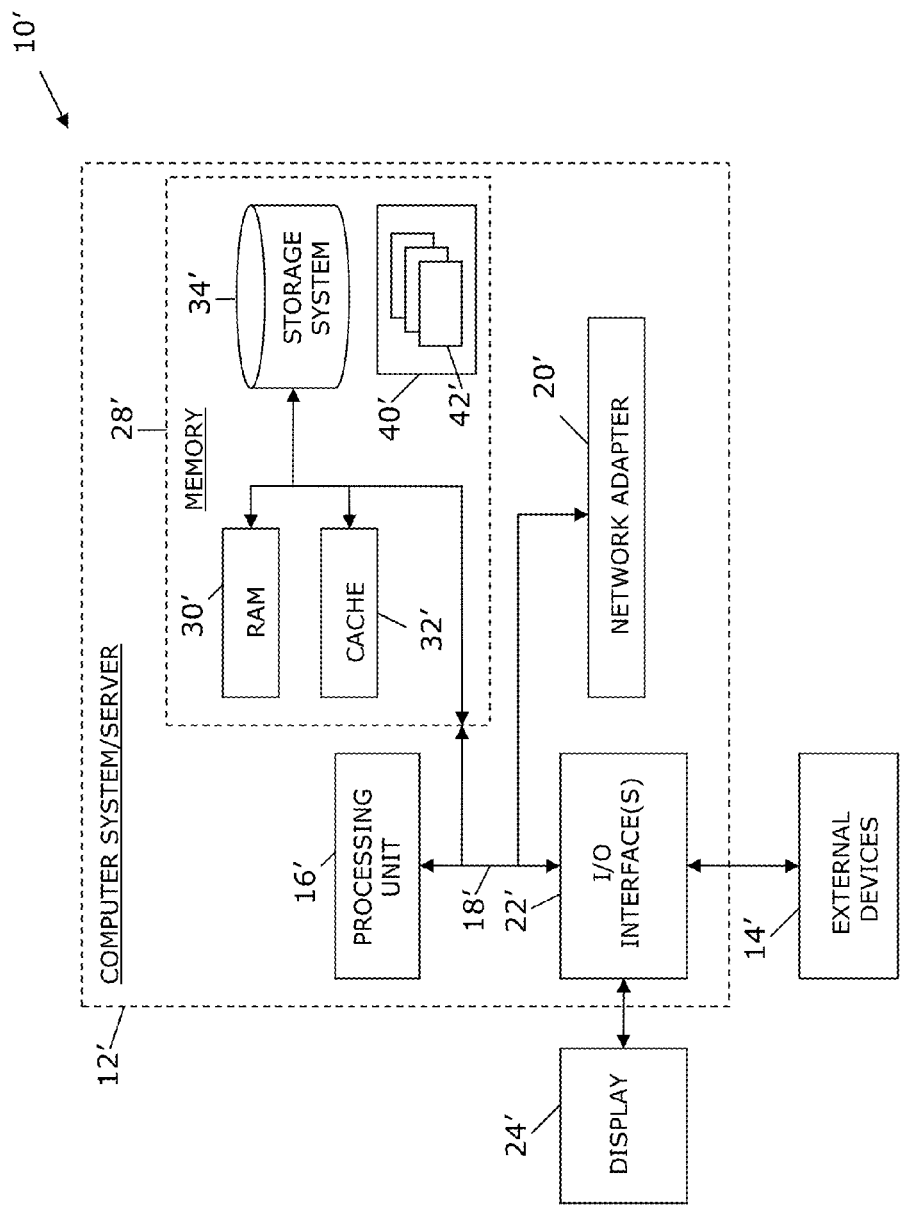
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating location area boundaries to optimize the identification of routes, the method comprising:
   utilizing at least one processor to execute computer code that performs the steps of:
   receiving at least one location map comprising a plurality of possible routes;
   identifying at least one location area configuration, wherein the location area configuration comprises a set of segments, relative to the at least one location map, of at least one location area boundary segment and wherein a location area boundary segment comprises a virtual boundary line between cellular network base station associations;
   computing a utility of the at least one location area configuration, wherein the utility comprises an identification of a number of routes that can be identified using the location area configuration, wherein a route comprises at least one identified traversable sub-route and wherein the at least one traversable sub-route is identified using the at least one location area boundary segment;
   identifying at least one prominent location area boundary segment, wherein a prominent location area boundary segment comprises a location area boundary segment having a computed utility exceeding a predetermined threshold; and
   generating a location area map comprising a plurality of identified prominent location area boundary segments, wherein the location area map defines boundary segments of a location area and wherein the location area map provides identification of a plurality of sub-routes that have been identified as having a utility exceeding a predetermined threshold.

2. The method of claim 1, wherein the computing a utility comprises computing a utility of one of the location area boundary segments contained within the location area configuration.

3. The method of claim 1, wherein the computing a utility comprises identifying a unique route and sub-routes that can be identified using the at least one location area boundary.

4. The method of claim 1, wherein the computing a utility comprises calculating entropy related to the at least one location area configuration, wherein the entropy relates to an uncertainty of route assignment.

5. The method of claim 1, further comprising receiving at least one point having an identified coverage area.

6. The method of claim 5, wherein the at least one sub-route is identified using the at least one location area boundary segment and the at least one point having an identified coverage area.

7. The method of claim 1, further comprising receiving at least one starting point and one ending point of at least one traversed route within the plurality of possible routes.

8. The method of claim 7, wherein the computing a utility comprises identifying a number of sub-routes of the traversed route that can be identified using the at least one location area boundary segment.

9. The method of claim 8, wherein the identifying at least one prominent location area boundary segment comprises identifying a location area boundary segment in which the number of sub-routes of the traversed route that can be identified exceeds a predetermined threshold.

10. The method of claim 7, wherein the identifying at least one prominent location area boundary segment comprises weighting sub-routes based upon an amount of traversal and identifying a sub-route that has an amount of traversal exceeding a predetermined threshold.

11. The method of claim 1, wherein the generating a location area map comprises connecting the identified prominent location area boundary segments to define the boundaries of the location area.

12. The method of claim 1, wherein the generating a location area map comprises using a coloring problem and assigning the same color to neighboring grids not separated by a prominent location area boundary segment.

13. An apparatus for generating location area boundaries to optimize the identification of routes, the apparatus comprising:
   at least one processor; and
   a non-transitory computer readable storage medium having computer readable program code embodied therewith and executable by the at least one processor, the computer readable program code comprising:
   computer readable program code that receives at least one location map comprising a plurality of possible routes;
   computer readable program code that identifies at least one location area configuration, wherein the location area configuration comprises a, relative to the at least one location map, of at least one location area boundary segment and wherein a location area boundary segment comprises a virtual boundary line between cellular network base station associations;
   computer readable program code that computes a utility of the at least one location area configuration, wherein the utility comprises an identification of a number of routes that can be identified using the location area configuration, wherein a route comprises at least one identified traversable sub-route and wherein the at least one traversable sub-route is identified using the at least one location area boundary segment;
   computer readable program code that identifies at least one prominent location area boundary segment, wherein a prominent location area boundary segment comprises a location area boundary segment having a computed utility exceeding a predetermined threshold; and computer readable program code that generates a location area map comprising a plurality of identified prominent location area boundary segments, wherein the location area map defines boundary segments of a location area and wherein the location area map provides identification of a plurality of sub-routes that have been identified as having a utility exceeding a predetermined threshold.

14. A computer program product for generating location area boundaries to optimize the identification of routes, the computer program product comprising:

a non-transitory computer readable storage medium having computer readable program code embodied therewith, the computer readable program code comprising:

computer readable program code that receives at least one location map comprising a plurality of possible routes;

computer readable program code that identifies at least one location area configuration, wherein the location area configuration comprises a, relative to the at least one location map, of at least one location area boundary segment and wherein a location area boundary segment comprises a virtual boundary line between cellular network base station associations;

computer readable program code that computes a utility of the at least one location area configuration, wherein the utility comprises an identification of a number of routes that can be identified using the location area configuration, wherein a route comprises at least one identified traversable sub-route and wherein the at least one traversable sub-route is identified using the at least one location area boundary segment;

computer readable program code that identifies at least one prominent location area boundary segment, wherein a prominent location area boundary segment comprises a location area boundary segment having a computed utility exceeding a predetermined threshold; and computer readable program code that generates a location area map comprising a plurality of identified prominent location area boundary segments, wherein the location area map defines boundary segments of a location area and wherein the location area map provides identification of a plurality of sub-routes that have been identified as having a utility exceeding a predetermined threshold.

15. The computer program product of claim 14, wherein the computer readable program code that computes a utility comprises identifying a unique route and sub-routes that can be identified using the at least one location area boundary.

16. The computer program product of claim 14, further comprising computer readable program code that receives at least one point having an identified coverage area and wherein the at least one sub-route is identified using the at least one location area boundary segment and the at least one point having an identified coverage area.

17. The computer program product of claim 14, further comprising computer readable program code that receives at least one starting point and one ending point of at least one traversed route within the plurality of possible routes and wherein the computing a utility comprises identifying a number of sub-routes of the traversed route that can be identified using the at least one location area boundary segment.

18. The computer program product of claim 17, wherein the computer readable program code that identifies at least one prominent location area boundary segment comprises identifying a location area boundary segment in which the number of sub-routes of the traversed route that can be identified exceeds a predetermined threshold.

19. The computer program product of claim 14, wherein the computer readable program code that generates a location area map comprises connecting the identified prominent location area boundary segments to define the boundaries of the location area.

20. A method of generating location area boundaries to optimize the identification of routes, the method comprising:

utilizing at least one processor to execute computer code that performs the steps of:

receiving at least one location map comprising a plurality of possible routes;

receiving at least one cellular base station having an identified coverage area associated with the at least one location map;

receiving at least one mobility record, wherein the at least one mobility record identifies at least one common route through the at least one location map, wherein the at least one common route comprises more than one possible sub-route;

identifying at least one location area configuration, wherein the location area configuration comprises a set of segments, relative to the at least one location map, of at least one location area boundary segment and wherein a location area boundary segment comprises a virtual boundary line between cellular network base station associations;

computing a utility of the at least one location area configuration, wherein the utility comprises an identification of a number of routes that can be identified using the location area configuration, wherein a route comprises at least one identified traversable sub-route and wherein the at least one traversable sub-route is identified using the at least one location area boundary segment and the at least one cellular base station;

the computing a utility comprising identifying a number of sub-routes of the common route that can be identified using the at least one location area boundary segment;

identifying at least one prominent location area boundary segment, wherein a prominent location area boundary segment comprises a location area boundary segment in which the number of sub-routes of the at least one common route that can be identified exceeds a predetermined threshold; and generating a location area map comprising a plurality of identified prominent location area boundary segments, wherein the generating comprises connecting the identified prominent location area boundary segments to define the boundaries of a location area and wherein the location area map provides identification of a plurality of sub-routes that have been identified as having a utility exceeding a predetermined threshold.

* * * * *